United States Patent [19]

Inoue et al.

[11] Patent Number: 4,646,698
[45] Date of Patent: Mar. 3, 1987

[54] START AND TERMINATION TIMING CONTROL OF FUEL INJECTION

[75] Inventors: Hidehiko Inoue; Toshio Kondo; Shigenori Isomura, all of Kariya, Japan

[73] Assignee: Nippondenso Co., Ltd., Kariya, Japan

[21] Appl. No.: 760,249

[22] Filed: Jul. 29, 1985

[30] Foreign Application Priority Data

Jul. 30, 1984 [JP]  Japan .............................. 59-160400

[51] Int. Cl.⁴ ............................................. F02D 41/18
[52] U.S. Cl. ..................................... 123/478; 123/427
[58] Field of Search ............... 123/427, 478, 480, 487, 123/488

[56] References Cited

U.S. PATENT DOCUMENTS

| | | | |
|---|---|---|---|
| 3,890,944 | 6/1975 | Werner et al. | 123/427 |
| 4,121,545 | 10/1978 | Mizote | 123/488 X |
| 4,140,087 | 2/1979 | Daumer et al. | 123/487 X |
| 4,221,194 | 9/1980 | Wright | 123/478 |
| 4,314,534 | 2/1982 | Nakajima et al. | 123/478 X |
| 4,320,732 | 3/1982 | Schnurle et al. | 123/478 |
| 4,574,761 | 3/1986 | Isomura et al. | 123/478 |

FOREIGN PATENT DOCUMENTS 2709187  9/1978  Fed. Rep. of Germany ...... 123/478

Primary Examiner—Tony M. Argenbright
Attorney, Agent, or Firm—Cushman, Darby & Cushman

[57] ABSTRACT

An electronically controlled fuel injection system for an internal combustion engine, the system being of the type which controls fuel injection using the charging and discharging of a capacitor and comprising engine operating parameter sensors, a capacitor, and a control unit for controlling the charging and discharging of the capacitor. The charging of the capacitor is initiated at a timing determined as a function of engine speed and throttle opening angle and the discharging thereof is initiated subsequently to the completion of the charging. The charging time period is determined by engine speed and the discharging current is determined by intake air quantity. A basic fuel injection signal is produced so as to have a pulse duration equal to the discharging time period.

8 Claims, 10 Drawing Figures

START AND TERMINATION TIMING CONTROL OF FUEL INJECTION

BACKGROUND OF THE INVENTION

The present invention relates to electronically controlled fuel injection for internal combustion engines, and more particularly to a system for electronically controlling fuel injection on the basis of the charging and discharging of a capacitor.

As a system for controlling fuel injection into an internal combustion engine is well known an electronically controlled fuel injection system wherein the fuel injection quantity to be injected into the engine is controlled in accordance with engine operating parameters including intake air quantity. It is important for such a system to immediately and accurately respond to the fuel injection quantity requirements under varying engine operating conditions. However, when particularly performing the control of fuel injection quantity independently for each cylinder of a multi-cylinder engine, the problem of responsibility is encountered as a result of converting the amount of intake air to a corresponding digital signal to compute the fuel injection quantity by a microcomputer or the like.

Attempts to avoid the problem noted above have been made hitherto, such a technique being disclosed in Japanese Pat. No. 55-36814, in which a basic injection time period is determined so as to be equal to a discharging time period of a capacitor, the capacitor being charged by a constant current and the discharging current being determined as a function of intake air quantity. However, the prior art system does not still produce satisfactory results, since the system is arranged such that the basic injection pulse signal is generated in response to a predetermined crank angular position. Namely, to perform the control of fuel injection amount independently for each cylinder, it is required that the fuel injection is terminated before a piston reaches a top dead center (i.e. an angle greater than BTDC 5° or so) which is the start position of intake stroke of the cylinder in view of blow-by of injected fuel caused by valve overlap. However, the basic injection quantity is determined in response to the charging and discharging actions performed with respect to a predetermined crank angle, and therefore this results in the difficulty to control the termination timing of fuel injection in accordance with engine operating conditions.

SUMMARY OF THE INVENTION

It is accordingly an object of the present invention to provide a new and improved fuel injection control system which overcomes the above-described disadvantages inherent in the prior art control systems.

With this and other objects which will become apparent as the description proceeds, a fuel injection control system for an internal combustion engine according to the present invention comprises sensors for sensing engine operating parameters including intake air quantity, engine speed and throttle opening angle, a capacitor, and a control unit for controlling the charging and discharging of the capacitor.

According to a feature of this invention, the charging of the capacitor is initiated at a timing determined as a function of engine speed and throttle opening angle and the discharging thereof is initiated subsequently to the completion of the charging. The charging time period is determined by engine speed and the discharging current is determined by intake air quantity. A basic fuel injection signal is determined so as to have a pulse duration equal to the discharging time period. Thus, since the charging initiation timing is determined independently of a predetermined crank angular position and further the charging time period is determined independently of a predetermined crank angle, it not only makes it possible to accurately control so as to terminate the fuel injection at a predetermined timing, but also offers further feature of making possible to perform variable control of injection termination timing in accordance with engine operating parameters.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
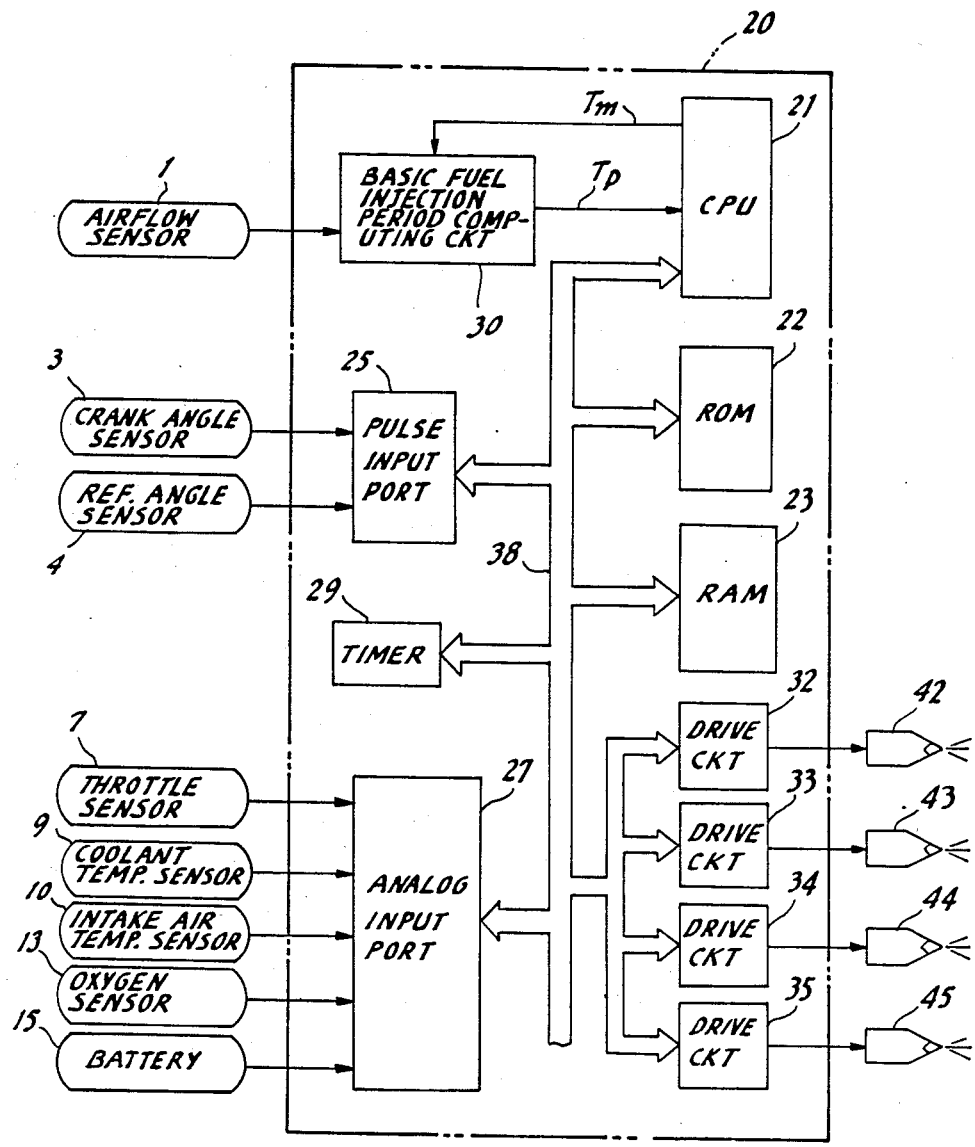
FIG. 1 is a schematic block diagram of a fuel injection control system according to the present invention.

Referring now to FIG. 1, there is illustrated an electronic fuel injection control system according to the present invention to be incorporated with a four-cylinder four cycle internal combustion engine wherein the control of fuel injection quantity is performed independently for each cylinder.

The electronic fuel injection control system comprises a control unit 20 with a central processing unit (CPU) 21 which performs the fuel injection control in accordance with programmed instructions. The CPU 31 is coupled through a common bus 38 to its associated units including a read-only memory (ROM) 22, a random access memory (RAM) 23, a pulse input port 25, an analog input port 27, a timer 29, a basic fuel injection time period computing unit 30 and injector drive circuits 32 to 35. The control unit 20 is coupled to engine operating parameter sensors including an intake airflow sensor 1 for sensing the amount of intake air, a crank angle sensor 3 which generates a pulse signal at intervals of 30° CA (crank angle), that is, 24 pulses for each two revolutions of the engine crankshaft, a reference angle sensor 5 which generates a pulse responsively to a reference angular position corresponding to a top dead center (TDC) of the first cylinder indicative of the completion of exhaust stroke, a throttle sensor 7 for sensing the opening angle VTH of the throttle valve which is operatively coupled to an accelerating pedal (not shown), an engine coolant temperature sensor 9, an intake air temperature sensor 11 for sensing the intake air temperature THA and an oxygen sensor 13 for sensing whether the fuel-air ratio is rich or lean side with respect to stoichiometry. A battery 15 is further coupled thereto.

The pulse input port 25 receives pulse signals from the crank angle sensor 3 and reference angle sensor 5 and generates an interrupt control signal in accordance with the output signal of the crank angle sensor 3, the interrupt control signal being supplied to the CPU 21. The analog input port 27 receives analog signals from the throttle sensor 7, coolant temperature sensor 9, intake air temperature sensor 11, oxygen sensor 13 and battery 15, and the received analog signals are converted respectively to corresponding digital form by an A/D converter encased therein. The digitized signals are read by the CPU 21 at intervals of 4-millisecond, for example, in accordance with a control routine, not illustrated. The CUP stores the signals as data to respective predetermined storage locations of the RAM 23. The free-running type real-time timer 29 is arranged to count down by a predetermined value set under the control the CPU 21 and generate an interrupt control signal in response to the completion of counting. Each of the drive circuits 32 to 35 drives each of solenoid-operated fuel injection valves 42 to 45, which is provided for each cylinder, in accordance with an instruction from the CPU 21.

Figure 2:
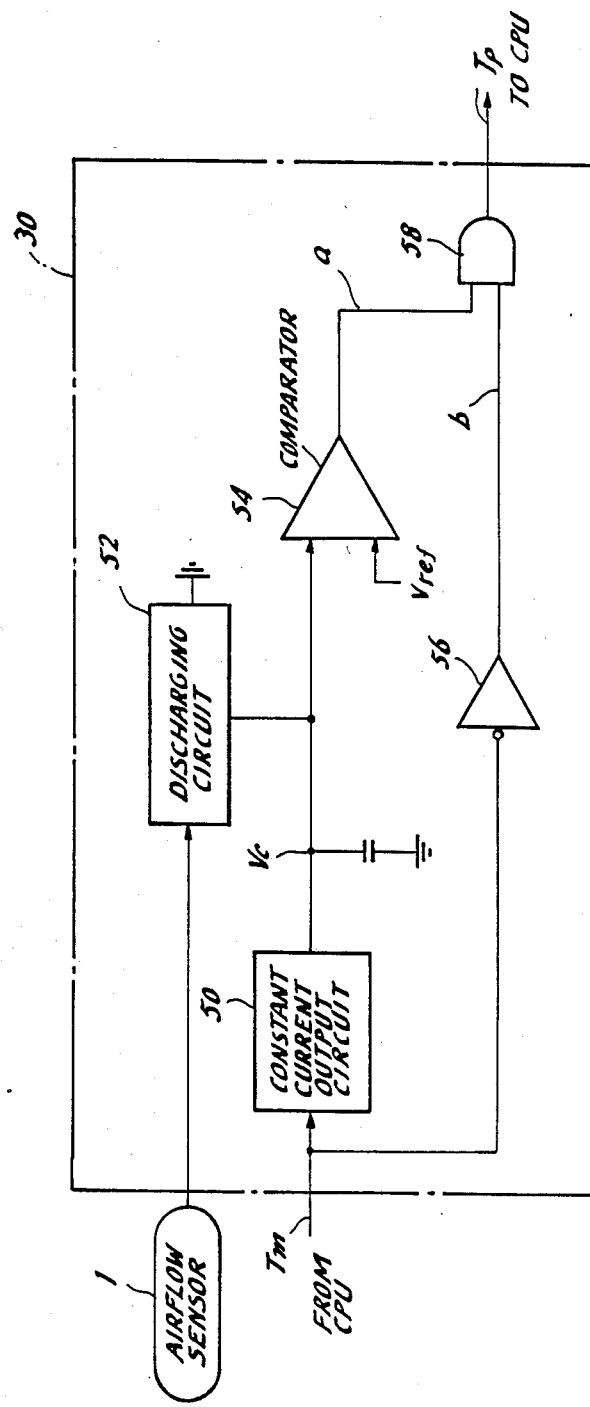
FIG. 2 is a schematic block diagram illustrating a basic fuel injection time period computing unit of the fuel injection control system.

The detailed arrangement of the basic injection time period computing unit 30 will be described with reference to FIG. 2.

The computing unit 30 comprises a constant current output circuit 50 which charges a capacitor C with a constant current during the presence of a charging signal Tm supplied from the CPU 21, a discharging circuit 52 which performs the discharging of the capacitor C with a current value determined as a function of an engine intake air quantity Q sensed by the intake airflow sensor 1 after the completion of charging, a comparator 54 for comparing the voltage across the capacitor C with a reference value Vref (generally zero volt), an inverter 56 for inverting the level of the charging signal Tm and an AND gate 58 coupled to the output side of the comparator 54 and the output side of the inverter 56. The charging circuit comprises a potentiometer which is arranged to assumes a resistance value proportional to the amount of intake air sensed by the intake airflow sensor 1, or a potentiometer which is arranged to control discharging current in accordance with the output voltage of the intake airflow sensor 1.

Figure 3:
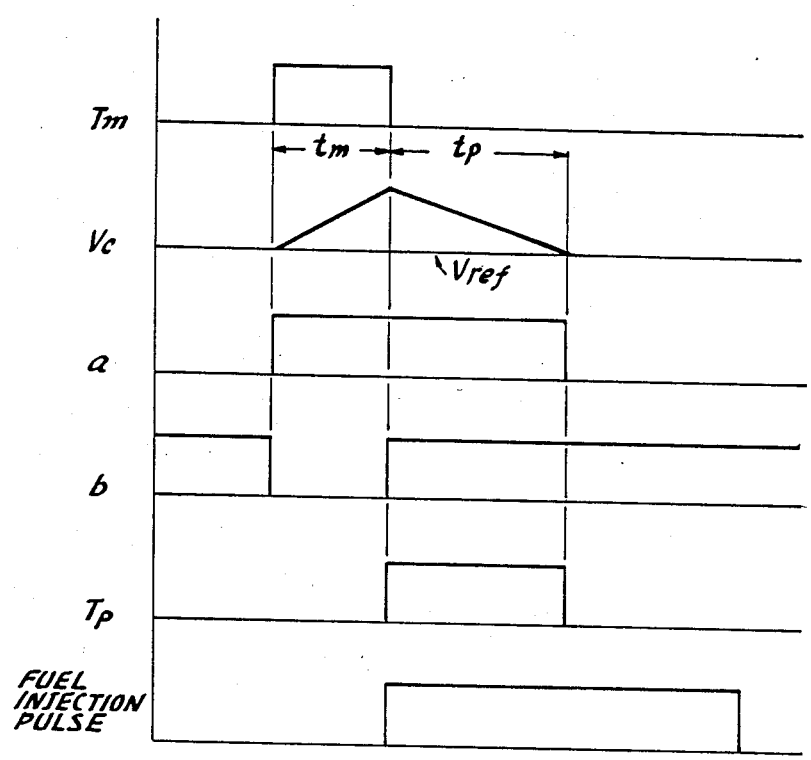
FIG. 3 is a time chart useful for understanding the operations of the basic fuel injection time period computing umit.

FIG. 3 is a time chart useful for understanding the operations of the basic injection time period computing unit 30. In FIG. 3, in response to the charging pulse signal Tm supplied from the CPU 21, the voltage Vc across the capacitor C linearly increases during the pulse duration tm of the signal Tm. The pulse duration tm is basically derived from the reciprocal of engine speed Ne and is corrected in accordance with the other parameters. The discharging current is determined in accordance with the amount of intake air Q obtained by the intake airflow sensor 1, and as a result the discharging period tp is determined as a function of intake air amount per one engine rotation Q/Ne. The basic fuel injection pulse signal Tp is produced with the output signal a of the comparator 54 and the output signal b of the inverter 56 being ANDed. The output signal a has a pulse duration equal to tm+tp and the output signal b is the inversion of the charging signal Tm. Therefore, the pulse duration of the basic injection pulse signal Tp is equal to the discharging period tp. The fuel injection pulse signal is produced on the basis of the signal Tp.

Figure 4A:
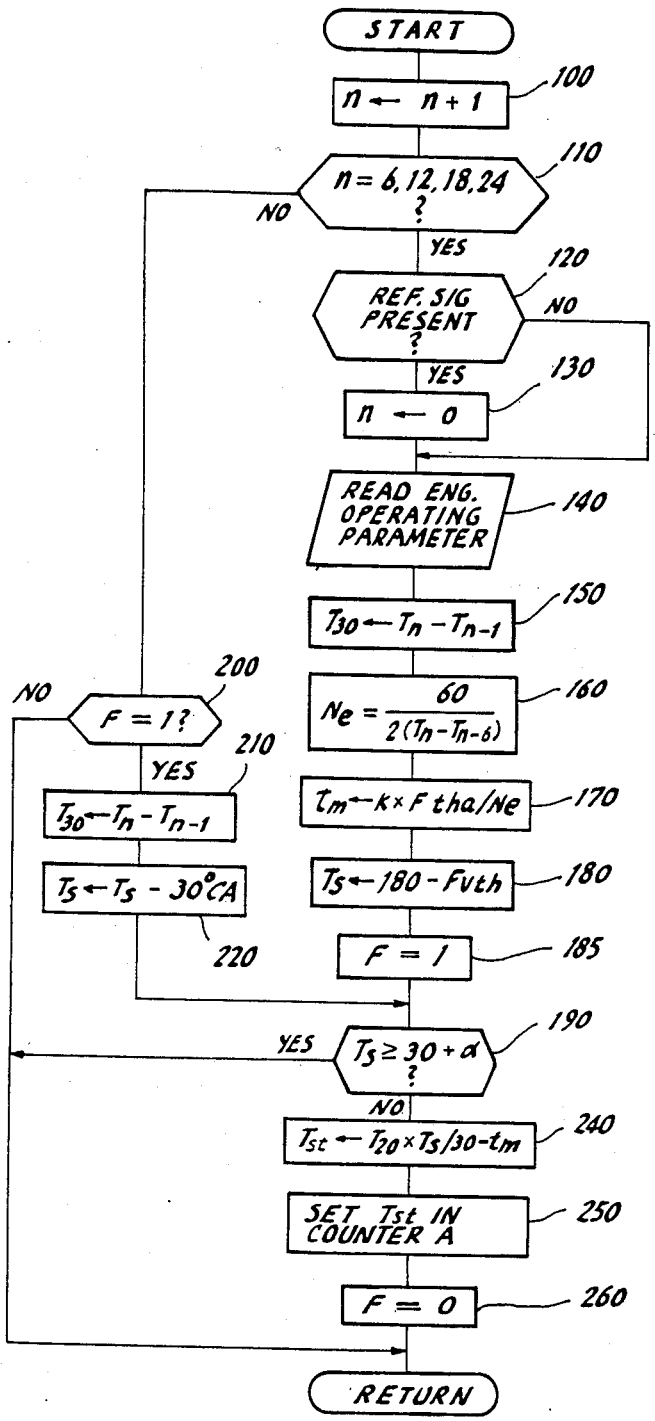
FIGS. 4A, 4B, 5A and 5B are schematic flow charts illustrating the operations performed by a control unit of the fuel injection control system according to this invention.
Figure 6:
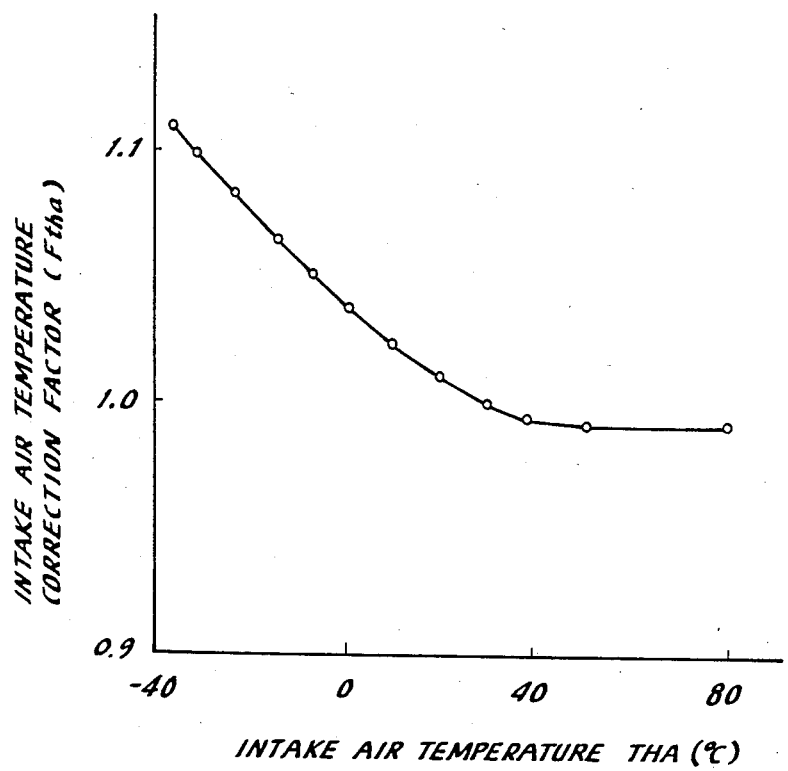
FIG. 6 is a graph showing intake air temperature correction factor Ftha with respect to intake air temperature THA.

FIGS. 4A, 4B, 5A and 5B are schematic flow charts illustrating the operations performed by the control unit 20. The interrupt routine of FIG. 4A is performed at intervals of 30° CA. In a step 100, the count value n of a counter is incremented by 1. This counter counts the output pulses of the crank angle sensor 3 which occur after the generation of the output pulse of the reference angle sensor 5. Therefore, the count value n is repeated from zero to 24 with respect to the generation of each output pulse of the sensor 5. A subsequent step 110 follows to check whether the count value n is one of 6, 12, 18 and 24. One of them indicates the initiation of exhaust stroke of a cylinder. If so, a step 120 is executed to check the presence or absence of the output pulse of the reference angle sensor 5. If the output pulse is present, a step 130 is executed to reset the count value n to zero. On the other hand, if it is absent, control jumps to a step 140. In the step 140, engine operating parameters are read which includes throttle valve opening angle VTH, engine coolant temperature, intake air temperature THA and so on. The read parameters are respectively stored in predetermined storage locations of the RAM 23. The next step 150 is provided for computing the difference between the real time Tn of the present execution of this routine and the real time Tn−1 of the last execution thereof. The difference indicates a 30° CA-rotation time period $T30 = Tn - Tn-1$. The real time for each count value n is derived from the timer 29 and stored in specific locations of the RAM 23. A step 160 follows to obtain engine speed Ne. The engine speed Ne is given by the equation $Ne = 60/\{2(Tn - Tn - 6)\}$, where Tn represents the real time of the present execution of this routine and Tn−6 represents the real time of the execution before 180° CA. In a subsequent step 170, using engine speed Ne obtained in the previous step 160, the pulse duration tm of the charging signal Tm is computed by the following equation:

$$tm = k \times Ftha/Ne$$

where:
K = constant
Ftha = intake air temperature correction factor
Ftha is obtained in accordance with an Ftha-vs-THA curve of FIG. 6, and is used for converting the intake air amount obtained by the airflow sensor 1 to a corresponding intake air weight. This conversion results in more accurate fuel injection control.

Figure 7:
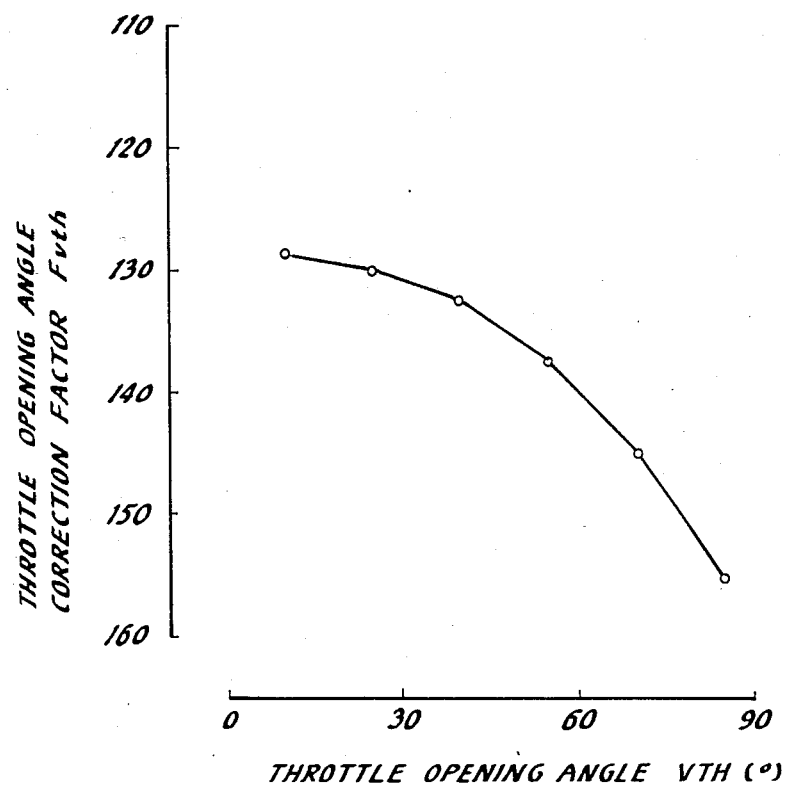
FIG. 7 is a graph showing throttle opening angle correction factor Fvth with respect to throttle valve opening angle VTH.

A step 180 is provided for determining the initiation timing Ts of fuel injection. To avoid the blow-by of injection fuel which occurs during valve overlap, it is generally required that fuel injection is initiated so that it is terminated up to reaching a predetermined crank angle (BTDC) prior to a top dead center initiating the intake stroke of a cylinder. A fuel injection quantity is determined in accordance with the amount of intake air and the intake air amount is controlled by the opening angle VTH of the throttle valve. This means that the fuel injection quantity is approximately obtained by the opening angle VTH of throttle valve detected by the throttle sensor 7. Therefore, it is possible that the fuel injection initiation timing Ts can be determined in accordance with the opening angle VTH. FIG. 7 is a graph showing throttle opening angle correction factor Fvth with respect to throttle valve opening angle VTH. Using the throttle opening angle correction factor Fvth determined by the throttle valve opening angle VTH, the fuel injection initiation timing Ts is given by the equation $Ts = 180° \ CA - Fvth$. The correction factor Fvth is established so that the fuel injection is terminated up to BTDC 5° CA. The initiation timing Ts is given as crank angle with respect to the bottom dead center initiating exhaust stroke of a cylinder.

The step 180 is followed by a step 185 in which flag F is set to 1. Flag F=1 indicates that control is performed for the initiation of fuel injection. A step 190 follows to check whther $Ts \geq 30° + \alpha$, where $\alpha$ represents a constant. The constant $\alpha$ is determined so that charging signal output time Tst obtained in the following step 240 assumes a positive value. Therefore, the value of the constant $\alpha$ varies in accordance with the value of the constant k of the step 170. This addition of $\alpha$ is caused by the fact that the charging signal Tm is generated prior to the initiation of injection of fuel. If $Ts > 30° + \alpha$, this routine is terminated and again initiated from the step 100 in response to the next interrupt control signal generated when the engine crankshaft further rotates by 30° CA. After the execution of the step 100, control goes to the step 110 to check the count value n. In this case, since the count value is necessarily the number other than 6, 12, 18 or 24, a step 200 follows to check whether F=1. If not. This routine is terminated. However, in the execution immediately after the satisfaction of $Ts \geq 30° + \alpha$ in the step 190, the flag F is 1, and therefore the step 200 is followed by a step 210 in which the 30° CA rotation time period T30 is updated in accordance with the equation $T30 = Tn - Tn - 1$. A subsequent step 220 is executed to subtract 30° CA from the the value of fuel injection initiation timing Ts obtained in the step 180. After the execution of this step 220, the operational flow goes to the step 190 to again check whether $Ts \geq 30° \ CA + \alpha$. This is repeated until Ts becomes smaller than $30° \ CA + \alpha$. If $Ts < 30° + \alpha$, control goes to a step 240 to calculate the output time Tst of charging signal Tm in accordance with the following equation:

$$Tst = (T30 \times Ts)/30 - tm$$

Namely, the output time Tst is obtained by subtracting the pulse duration tm of the charging signal Tm form the initiation time of fuel injection given by $T30 \times Ts/30$.

A step 250 follows to set the obtained output time Tst in a down-counter A of the timer 29, and after the flag F is reset to zero in a step 260, this routine is terminated.

Figure 4B:
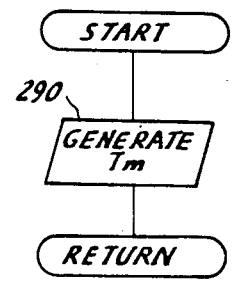

When the down-counter A has been counted to zero, An interrupt routine shown in FIG. 4B is started. In a step 290, a charging pulse signal Tm is generated, and a basic fuel injection signal Tp is generated in response to the turnning-off of the charging pulse signal Tm as understood by the time chart of FIG. 3.

Figure 5A:
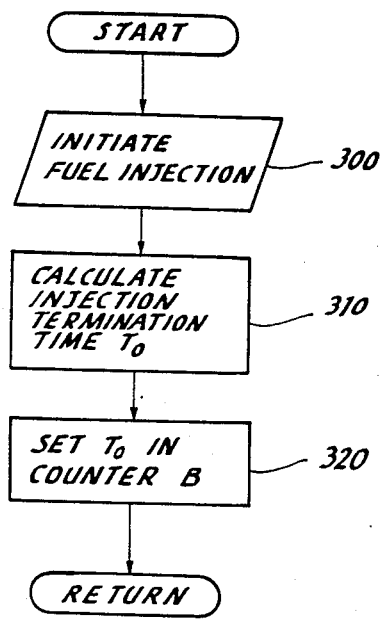
Figure 5B:
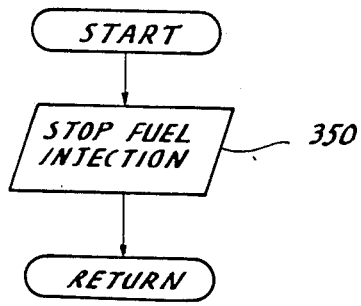

On the other hand, in response to the generation of the fuel injection signal Tp, The CPU 21 executes an interrupt routine shown in FIG. 5A. In a step 300, The fuel injection valve (one of 42 to 45) for a cylinder which is presently in a exhaust condition is energized by the corresponding drive circuit (one of 32 to 35) to start injection of fuel into the cylinder. A subsequent step 310 is executed to calculate a fuel injection termination time To. The termination time To is obtained by adding a fuel injection time period $\tau$ to the injection initiation real time Tr, that is, by the equation $To = Tr + \tau$. The fuel injection time period $\tau$ is obtained by correcting the pulse duration tp of the basic fuel injection signal Tp in accordance with correction factors derived from engine operating parameters including coolant temperature, air-fuel ratio and the like. This Tp input interrupt routine is termined after the obtained termination time To is set in a down-counter B of the timer 29. When the down-counter B counts down by the set value, the timer 29 generates an interrupt control signal, and in response to the interrupt control signal the CPU initiates an interrupt routine shown in FIG. 5B. This interrupt routine is provided for stopping the injection of fuel and is terminated after the fuel injection valve is closed in the step 350 thereof.

Figure 8:
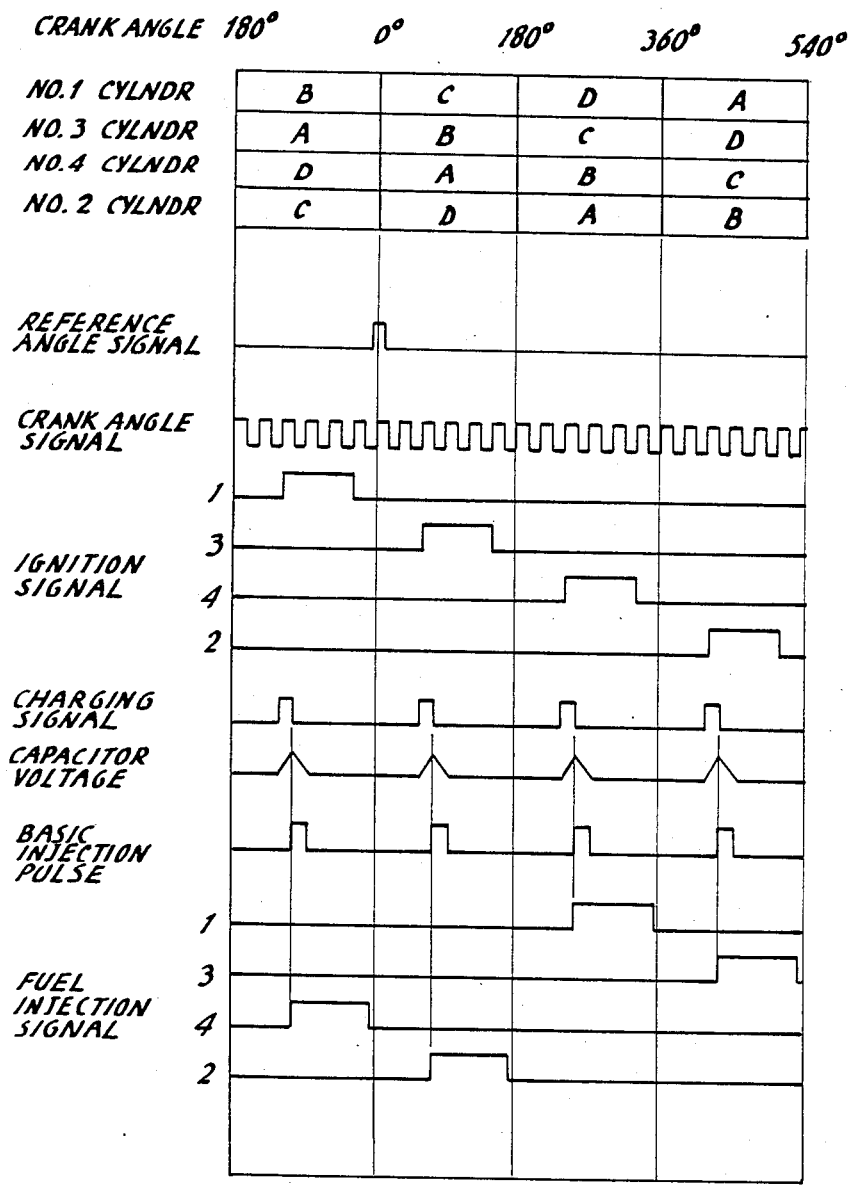
FIG. 8 is a time chart useful for understanding the operations performed by the control system according to this invention.

FIG. 8 is a time chart useful for understanding above-described fuel injection control. The reference characters A, B, C and D represent respectively intake stroke, compression stroke, power stroke and exhaust stroke. The charging signal Tm is generated for a cylinder which is in exhaust condition, and the basic fuel injection signal Tp is generated in response to the initiation of discharging of the capacitor and is turned off in response to the termination thereof.

The above-described embodiment is just an example of the present invention, and therefore, it will be apparent for those skilled in the art that many modifications and variations may be made without departing from the spirit of the present invention.

What is claimed is:

1. A fuel injection system for an internal combustion engine, comprising:
   first sensor means for sensing intake air quantity of said engine;
   second sensor means for sensing rotational speed of said engine;
   third sensor means for sensing throttle opening angle of said engine;
   capacitor means to be charged and discharged by charging and discharging currents respectively;
   means for initiating charging of said capacitor means at a timing determined by said sensed rotational speed and said sensed throttle opening angle and for charging said capacitor means during a time period determined by said sensed rotational speed;
   means for initiating discharging of said capacitor means after the charging of said capacitor means and for discharging said capacitor means until said capacitor means is discharged, the discharging current being determined by said sensed intake air quantity and a termination timing of the discharging being determined in accordance with said initiation timing and said discharging current;
   means for producing a pulse signal in synchronism with the initiation of discharging of said capacitor means, said pulse signal having a time period proportional to the discharging period of said capacitor means; and
   means for injecting fuel into said engine in response to said pulse signal.

2. A fuel injection system according to claim 1, wherein said charging means includes:
   means for determining a desired start timing of fuel injection in accordance with said sensed throttle opening angle in such a manner that said desired start timing is advanced as said sensed throttlet opening angle increases;

means for determining said time period for charging said capacitor means as the reciprocal of said sensed rotational speed; and means for producing a charging control pulse by which said capacitor means is charged, said charging control pulse being intiated in advance of said desired start timing of fuel injection by an amount of time equal to said determined time period and continuing for said determined time period.

3. A fuel injection system according to claim 2, further comprising means for sensing intake air temperature of said engine, and wherein said time period determining means determines said time period for charging said capacitor means further as a function of said sensed intake air temperature.

4. A fuel injection system for an internal combustion engine, comprising:

a fuel injector for injecting fuel into said engine when activated;

a capacitor to be charged and discharged by charging and discharging currents, respectively, for determining a basic fuel injection period;

a plurality of condition sensors for detecting a plurality of operating conditions of said engine; and a programmed digital computer circuit for controlling said fuel injector and said capacitor in accordance with said detected operating conditions of said engine, said computer circuit including:

first means for determining a desired injection start timing of fuel injection of said fuel injector in accordance with at least one of said sensed operating conditions of said engine in such a manner that the fuel injection of said fuel injector is terminated before the transition from exhaust to intake stroke of said engine;

second means for determining a charging period for said capacitor so that said capacitor is charged by said charging current during said determined charging period before said desired injection start timing determined by said first means;

third means for measuring a discharging period of said capacitor which is discharged after said desired injection start timing determined by said first means;

fourth means for determining at least one of said charging and discharging currents in accordance with at least one of said detected operating conditions of said engine; and fifth means for activating said fuel injection from said desired injection start timing during a time period proportional to said measured discharging period of said capacitor.

5. A fuel injection system according to claim 4, wherein said condition sensor includes a sensor for detecting a throttle opening angle of said engine, and wherein said first means of said computer circuit determines said desired injection start timing in such a manner that said desired injection start timing is advanced as said sensed throttle opening angle increases.

6. A fuel injection system according to claim 4, wherein said condition sensor detects intake condition and rotational condition of said engine, and wherein said first means of said computer circuit determines said desired injection start timing in accordance with the detected intake condition and said second means determines said charging period in accordance with the detected rotational condition.

7. A fuel injection system for an internal combustion engine, comprising:

first sensor means for sensing intake air quantity of said engine;

second sensor means for sensing rotational speed of said engine;

third sensor means for sensing throttle opening angle of said engine;

injector means for supplying injection fuel into said engine;

analog circuit means for producing a basic fuel injection pulse signal which has a capacitor and a discharging circuit, said discharging circuit being coupled to said first sensor means; and digital control means for controlling the charging and discharging of said capacitor and controlling said injector means, said controlling means including:

means for generating a signal at a timing determined as a function of the rotational speed and throttle opening angle sensed by said second and third sensor means and supplying said signal to said capacitor so that said capacitor is charged by said signal during a time period determined in accordance with the rotational speed sensed by said second sensor means;

means for controlling said discharging circuit so that the discharging of said capacitor is initiated after the charging thereof and is varied in accordance with the intake air quantity sensed by said first sensor means; and means for controlling said injector means in response to a basic fuel injection signal generated by said basic fuel injection pulse signal producing means.

8. A fuel injection system according to claim 7, wherein said analog circuit means is arranged to produce the basic fuel injection signal having a pulse duration equal to the discharging time period of said capacitor.

* * * * *